US009477300B2

(12) United States Patent
Chen et al.

(10) Patent No.: US 9,477,300 B2
(45) Date of Patent: Oct. 25, 2016

(54) BRIDGING DEVICE AND POWER SAVING METHOD THEREOF

(71) Applicant: VIA TECHNOLOGIES, INC., New Taipei (TW)

(72) Inventors: Yen-Chang Chen, New Taipei (TW); Hui-Chih Lin, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 377 days.

(21) Appl. No.: 13/687,686

(22) Filed: Nov. 28, 2012

(65) Prior Publication Data

US 2013/0151881 A1 Jun. 13, 2013

(30) Foreign Application Priority Data

Dec. 12, 2011 (TW) .............................. 100145729 A

(51) Int. Cl.
*G06F 1/32* (2006.01)
*G06F 1/26* (2006.01)

(52) U.S. Cl.
CPC ............. *G06F 1/3296* (2013.01); *G06F 1/266* (2013.01); *G06F 1/325* (2013.01); *G06F 1/3287* (2013.01); *Y02B 60/1285* (2013.01)

(58) Field of Classification Search
CPC ............................ G06F 1/3287; G06F 1/3296
See application file for complete search history.

(56) References Cited

U.S. PATENT DOCUMENTS

| | | | |
|---|---|---|---|
| 6,015,537 A | 1/2000 | Gam | |
| 6,092,207 A * | 7/2000 | Kolinski et al. | ............. 713/323 |
| 6,460,106 B1 | 10/2002 | Stufflebeam | |
| 6,748,545 B1 * | 6/2004 | Helms | ........................... 713/300 |
| 7,624,286 B2 | 11/2009 | Lin et al. | |
| 8,527,798 B2 * | 9/2013 | Kastl et al. | .................... 713/324 |
| 2003/0070103 A1 * | 4/2003 | Kim | .............................. 713/300 |
| 2003/0151957 A1 * | 8/2003 | Pekny | ....................... 365/189.11 |
| 2009/0013164 A1 * | 1/2009 | Huang | .................. G06F 9/4401 |
| | | | 713/2 |
| 2009/0210734 A1 * | 8/2009 | Schramm et al. | ............. 713/324 |
| 2011/0055606 A1 * | 3/2011 | Wu | ........................ G06F 1/3203 |
| | | | 713/323 |
| 2011/0109371 A1 * | 5/2011 | Kastl et al. | .................... 327/427 |
| 2011/0121810 A1 * | 5/2011 | Tsai | .............................. 323/318 |
| 2011/0161694 A1 * | 6/2011 | Fujiwara | ....................... 713/310 |

(Continued)

FOREIGN PATENT DOCUMENTS

| | | |
|---|---|---|
| CN | 1202457 | 5/2005 |
| CN | 1619467 | 5/2005 |

(Continued)

OTHER PUBLICATIONS

Korec, Jacek, "Low Voltage Power MOSFETS", 2011, vol. 7, p. 16.*

(Continued)

*Primary Examiner* — Phil Nguyen
*Assistant Examiner* — Cheri Harrington
(74) *Attorney, Agent, or Firm* — McClure, Qualey & Rodack, LLP

(57) ABSTRACT

A bridging device and a power saving method thereof are disclosed. When a bridging chip of the bridging device receives a power saving command transferred from a host and thereby enters a power saving state, a voltage converter of the bridging device is disabled accordingly and a selection circuit selects to couple a bus voltage to the bridging chip to power the bridging chip. The bus voltage is transferred from the host through a power pin of a connector of the bridging device. The connector is coupled to the host.

16 Claims, 3 Drawing Sheets

(56) References Cited

U.S. PATENT DOCUMENTS

2012/0144213 A1* 6/2012 Chang et al. ............. 713/300
2012/0297222 A1* 11/2012 Lin et al. ................. 713/320
2013/0203463 A1* 8/2013 Kent et al. ............. 455/556.1
2014/0028384 A1* 1/2014 Menard et al. ........... 327/540

FOREIGN PATENT DOCUMENTS

| CN | 1811663 | 8/2006 |
| CN | 100361110 | 1/2008 |
| TW | I314291 | 9/2009 |
| TW | I316657 | 11/2009 |

OTHER PUBLICATIONS

Davis, Sam, "Schottky Diodes: the Old Ones Are Good, the New Ones Are Better", Mar. 2011, Power Electronics Technology, p. 36.*
Wikipedia, Dec. 10, 2010, "Schottky Diodes", https://en.wikipedia.org/?title=Schottky_diode.*
Electronic Tutorials, Dec. 30, 2011, "P-channel MOSFET Switch", http://www.electronics-tutorials.ws/transistor/tran_7.html.*
"Definition of Coefficient", Merrimam-Webster Dictionary, Apr. 11, 2010.*
English language translation of abstract of CN 1202457 (published May 18, 2005).
English language translation of abstract of CN 100361110 (published Jan. 9, 2008).

* cited by examiner

BRIDGING DEVICE AND POWER SAVING METHOD THEREOF

CROSS REFERENCE TO RELATED APPLICATIONS

This Application claims priority of Taiwan Patent Application No. 100145729, filed on Dec. 12, 2011, the entirety of which is incorporated by reference herein.

BACKGROUND OF THE INVENTION

1. Field of the Invention

The present invention relates to a bridging device connected between a host and an external peripheral device, and in particular relates to a power-saving method for a bridging device.

2. Description of the Related Art

In general, a host may contain one or more connection ports for communicating with external peripheral devices. Each connection port may relate to one communication protocol. When an external peripheral device does not support the communication protocol of the connection ports of a host, a bridging device is required as a communication protocol conversion media. By the bridging device, data communication between the external peripheral device and the host is achieved.

In conventional techniques, when a bridging device does not work for communication protocol conversion, the bridging chip of the bridging device is operated in a power-saving state which consumes very little power. However, a buck dc-dc converter which controls the voltage conversion in the bridging device still operates in a working state which consumes considerable power. Thus, the conventional bridging device may consume redundant power in the power-saving state because of the continuously operated buck dc-dc converter.

BRIEF SUMMARY OF THE INVENTION

A bridging device and a power saving method for the bridging device are shown in the disclosure.

A bridging device in accordance with an exemplary embodiment of the invention comprises a connector, a voltage converter, a bridging chip and a selection circuit. The connector is for connecting to a host, and has a power pin and a command pin. The voltage converter is coupled to a first voltage and down converts the first voltage to generate a second voltage. The bridging chip is coupled to the command pin and the voltage converter. The selection circuit is coupled to the power pin, the voltage converter and the bridging chip.

When the bridging chip enters a power-saving state according to a power saving command from the host transfers through the command pin, the voltage converter is disabled by the bridging chip. When the voltage converter is disabled by the bridging chip, the selection circuit conveys a bus voltage which is output from the host and transferred through the power pin to the bridging chip.

In another exemplary embodiment, a power saving method for a bridging device is shown and comprises the steps as follows: using a bridging device to connect to a host; controlling a bridging chip of the bridging device to enter a power-saving state in accordance with a power-saving command output from the host; disabling a voltage converter through the bridging chip, wherein the voltage converter down converts a first voltage that is coupled to the bridging device to a second voltage; and conveying a bus voltage to the bridging chip to power the bridging chip when the voltage converter is disabled.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
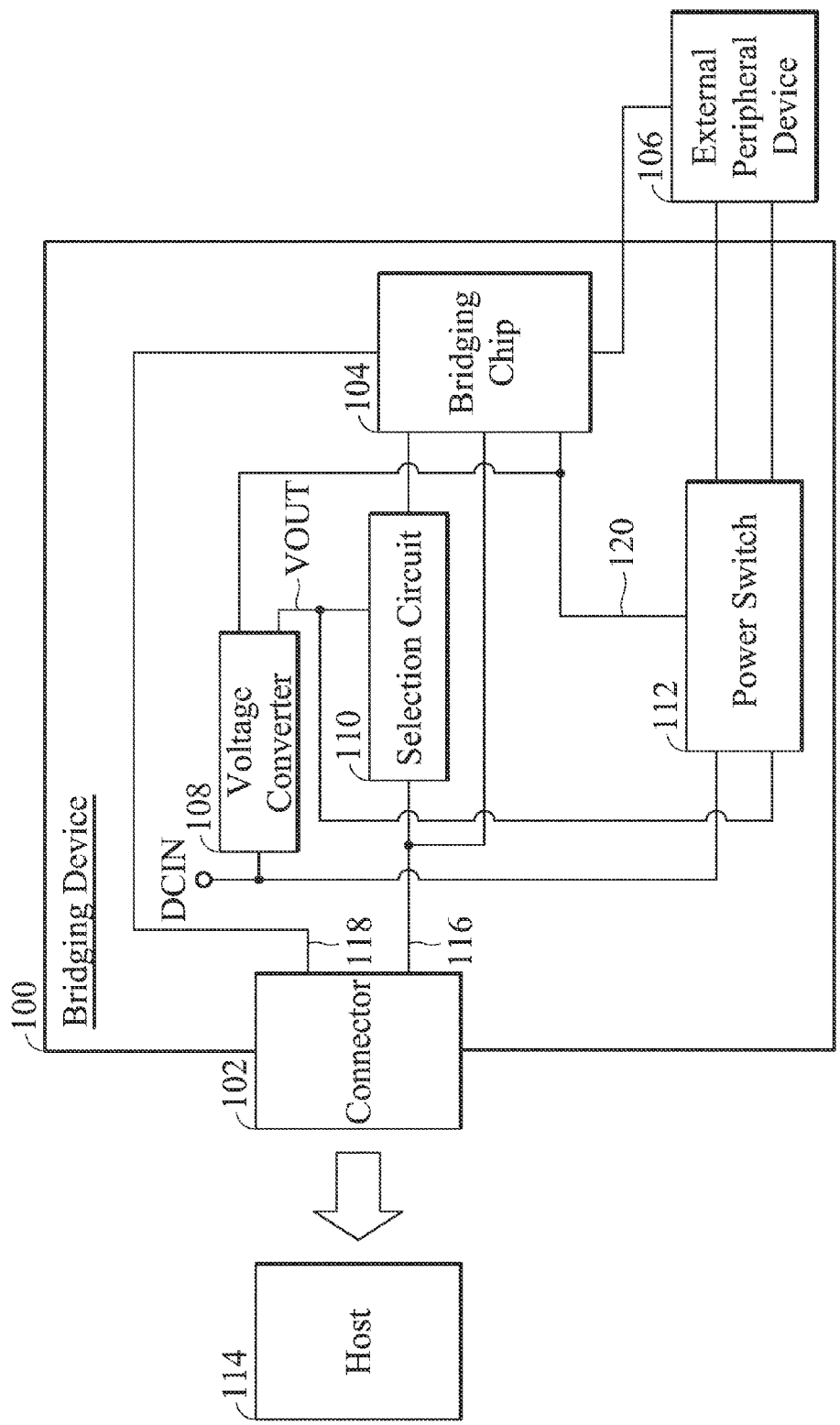
FIG. 1 depicts a bridging device 100 in accordance with an exemplary embodiment of the invention.

FIG. 1 depicts a bridging device 100 in accordance with an exemplary embodiment of the invention. The bridging device 100 may establish a connection between a host 114 and an external peripheral device 106. The bridging device 100 comprises a connector 102, a bridging chip 104, a voltage converter 108, a selection circuit 110 and a power switch 112. The connector 102 implements a communication interface (e.g. a universal serial bus interface or an IEEE 1394 interface and so on) to connect to the host 114. The connector 102 has a power pin 116 and a command pin 118.

In this paragraph, a power supply circuit for the bridging device 100 is discussed. In the exemplary embodiment of FIG. 1, a first voltage coupled to the bridging device 100 is labeled DCIN. The voltage converter 108 down converts the first voltage DCIN to generate a second voltage VOUT. Preferably, the voltage converter 108 is a buck dc-dc converter. The selection circuit 110 may select to convey a bus voltage (e.g. VBUS) or the second voltage VOUT to power the bridging chip 104. The bus voltage is transferred from the host 114 to the bridging device 100 through the power pin 116. When the selection circuit 110 receives both of the second voltage VOUT and the bus voltage, the selection circuit 110 selects to convey the second voltage VOUT to the bridging chip 104 in a normal operating state so that the bridging chip 104 is powered by the second voltage VOUT in the normal operating state. When the second voltage VOUT is unavailable (i.e., the voltage converter 108 does not generate the second voltage VOUT) and the selection circuit 110 only receives the bus voltage, the selection circuit 110 selects to convey the bus voltage to the bridging chip 104 so that the bridging chip 104 is powered by the bus voltage in a power-saving state. In this exemplary embodiment, the power of the second voltage VOUT provided from the voltage converter 108 is greater than the power of the bus voltage. When the bridging chip 104 is in a normal operating state, the firmware and hardware of the bridging chip 104 may continuously operate for data communication. To sufficiently power the bridging chip 104 to execute the procedures for data communication, the second voltage VOUT with greater power may be used to power the bridging chip 104. On the contrary, when in the power-saving state, all firmware of the bridging chip 104 are shut down and just a portion of the hardware is in the standby mode for waiting for a resume command from the host 114. Thus, the bus voltage with low power may be used to power the remaining hardware of the bridging chip 104 and thereby the power consumption of the bridging chip 104 in the power saving state is reduced. The power saving state may be the S3 or S4 state defined by the ACPI (Advanced Configuration and Power Interface). The ACPI further defines an S5 state which is a shutdown state. The aforementioned normal operating state may be defined as the S0 state of the ACPI. The operations of the components shown in the figure are discussed below.

Through the signal line 120, the bridging chip 104 controls the power switch 112 to choose whether to convey the first voltage DCIN and the second voltage VOUT both to the external peripheral device 106 to power the external peripheral device 106. In addition to the control of the power switch 112, the bridging chip 104 may further choose to enable or disable the voltage converter 108 through the signal line 120. For example, in a normal operating state (e.g. in the S0 state), the bridging chip 104 may turn on the power switch 112 and enable the voltage converter 108 through a control signal (conveyed by the signal line 120 and labeled 120 as well). When the power switch 112 is turned on, the first voltage DCIN and the second voltage VOUT both are conveyed to the external peripheral device 106. Further, the enabled voltage converter 108 is operative to provide the second voltage VOUT to the selection circuit 110.

In another aspect, when the bridging chip 104 enters a power saving state (e.g. the S3 or S4 state) according to a power saving command from the host 114 through the command pin 118, the bridging chip 104 may further turn off the power switch 112 and disable the voltage converter 108 through the control signal 120. The turned-off power switch 112 blocks the first voltage DCIN and the second voltage VOUT from powering the external peripheral device 106. The disabled voltage converter 108 stops operating and does not output the second voltage VOUT. Compared to conventional techniques in which the voltage converter, like a buck dc-dc converter, is incapable of stopping operations when the bridging device is in a power saving state, the bridging device 100 of the disclosure provides a voltage converter 108 which stops operations when the bridging chip 104 is in a power saving state. Thus, the power consumption of the bridging device 100 in a power-saving state is reduced for power saving.

As discussed above, when the bridging chip 104 is in a power-saving state, the selection circuit 110 may select to convey the bus voltage output from the host 114 to the bridging chip 104 to power the remaining hardware of the bridging chip 104. Compared to the second voltage VOUT for normal operations of the bridging chip 104, the power of the bus voltage is lower. It is worthy to note that if the host is incapable of providing the bus voltage in a power saving state, the selection circuit 110 does not convey power to the bridging chip 104. The bridging chip 104 is not powered and is in a shut down state (e.g. in the S5 state). Thus the bridging chip 104 consumes zero power in the shut down state and the power is further saved. As known by those skilled in the art, the shutdown bridging chip 104 (e.g. in the S5 state) cannot return to the normal operating state when no power is supplied. But note that in the present invention, when the host resumes from a power saving state to a normal operating state, the host 114 may output a resume command and provide the bridging device 104 with the bus voltage again. In the disclosure, the bus voltage provided from the host 114 once again may wake up the firmware of the bridging chip 104. The awaken firmware may retrieve storage units (not shown in the figure), such as registers, for the pre-stored coefficients relating to the normal operating state of the bridging chip 104. The awaken firmware may execute a resume operation according to the resume command and the retrieved coefficients. In this manner, after receiving the resume command and the bus voltage, the bridging chip 104 returns back to the normal operating state from the shutdown state in which no power is supplied to the bridging chip 104.

The electricity coupling between the components of the bridging chip 104 is discussed below. As shown in FIG. 1, the bridging chip 104 is electrically coupled to the power pin 116 and the command pin 118 of the connector 102, the external peripheral device 106, the voltage converter 108, the selection circuit 110 and the power switch 112. The bus voltage at the power pin 116 may be provided to the selection circuit 110 and the bridging chip 104. By the coupling of the command pin 118, the bridging chip 104 and the external peripheral device 106, the external peripheral device 106 communicates with the host 114 (that the connector 102 connects to) through the bridging chip 104. As the power pin 116 is directly coupled to the bridging chip 104, the bridging chip 104 could directly detect the bus voltage on the power pin 116. Note that the bus voltage that the bridging chip 104 directly detects from the power pin 116 is regarded as just a signal source for the bridging chip 104, which stably maintains the bridging chip 104 during normal operating state. That is, the bus voltage that the bridging chip 104 directly detects from the power pin 116 is not the power source of the bridging chip 104 during normal operating state. Referring to the coupling between the bridging chip 104 and the selection circuit 110, the bridging chip 104 receives the second voltage VOUT or the bus voltage from the selection circuit 110 as the power source of the bridging chip 104 in different states. Through the signal line 120, the bridging chip 104 is coupled to the power switch 112 and the voltage converter 108 both. The bridging chip 104 outputs a control signal 120 to control the power switch 112 and the voltage converter 108.

In conclusion, by the disclosure, the voltage converter 108 is disabled when the bridging chip 104 enters a power saving state. The voltage converter 108 does not consume power in the power-saving state such that the power consumption is reduced. However, in the conventional techniques, voltage converter, like a buck dc-dc converter, still performs voltage conversion even when the bridging chip is switched to a power-saving state. Redundant power consumption exists in the conventional techniques. This problem is solved by the disclosure. According to the techniques of the disclosure, the voltage converter 108 is disabled when the bridging chip 104 is in a power-saving state, saving more power than the conventional techniques. Note that the power saving design of electronic devices becomes increasingly important with environmental consciousness. The EuP (Econ-design of Energy-using Products) directive defines power consumption specifications for various electronic products. According to the disclosure, the power consumption of a bridging device is reduced, complying with the EuP directive.

In the following paragraphs, a mechanism that resumes the bridging chip 104 from a power saving or a shutdown state to a normal operating state is shown.

When the host 114 wants to resume from a power saving state to a normal operating state, the host 114 may transfer a resume command to the bridging chip 104 through the command pin 118 and transfer a bus voltage to the selection circuit 110 through the power pin 116. Note that when the bridging chip 104 is in the power saving or shutdown state, the voltage converter 108 is in a disabled state in which the voltage converter 108 stops operating and thereby does not provide the second voltage VOUT to the power switch 112 and the selection circuit 110. Thus, when the host 114 is resumed from the power-saving state to a normal operating state, the selection circuit 110 receives the bus voltage VBUS transferred through the power pin 116 without receiving the second voltage VOUT. The selection circuit 110, therefore, selects to convey the bus voltage to the bringing chip 104 in the power saving or shutdown state, to temporarily power the bridging chip 104 in the power saving or shutdown state. After receiving the bus voltage, the bridging chip 104 in the power saving or shutdown state may awake the firmware and the related hardware thereof. The awaken firmware and related hardware may execute a resume procedure according to the resume command from the host 114 to resume the normal operating state. And the bridging chip 104 may enable the voltage converter 108 and turns on the power switch 112 again. When the voltage converter 108 is enabled, the second voltage VOUT is output to the power switch 112 and the selection circuit 110. At this time, the selection circuit 110 receives the re-supplied second voltage VOUT and the originally existing bus voltage both. The selection circuit 110 may select to output the second voltage VOUT to power the bridging chip 104. The second voltage VOUT is the power source for the bridging chip 104 in the normal operating state. Further, the bridging chip 104 may turn on the power switch 112 by the control signal 120, and thereby the first voltage DCIN and the second voltage VOUT may power the external peripheral device 106 to resume to the normal operating state.

Figure 2A:
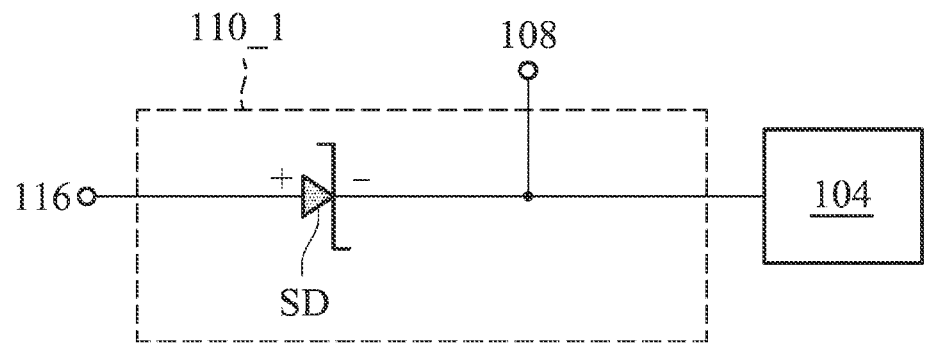
FIG. 2A depicts an exemplary embodiment of the selection circuit 110.

FIG. 2A depicts the selection circuit 110 in accordance with an exemplary embodiment of the invention.

Referring to FIG. 2A, the selection circuit 110_1 comprises a Schottky diode SD. The Schottky diode SD has an anode '+' and a cathode '−'. The anode '+' is coupled to the power pin 116 of the connector 102. The cathode '−' is coupled to the bridging chip 104 and the voltage converter 108. In the following discussion, the selection circuit 110_1 is discussed based on a USB interface. The bus voltage that the host 114 transfers through the power pin 116 is generally 5 volts. The second voltage VOUT is generally 5 volts, too. With the second voltage VOUT (when the voltage converter 108 is enabled), the voltage level of the anode '+' of the Schottky diode SD is 5 volts, the same as the voltage level of the cathode '−' of the Schottky diode SD. The Schottky diode SD is switched off when the voltage levels of the anode '+' and the cathode '−' are both 5 volts. Thus, when the anode '+' and the cathode '−' of the Schottky diode SD are coupled to the bus voltage and the second voltage VOUT, respectively, the Schottky diode SD blocks the bus voltage and allows the second voltage VOUT to the bridging chip 104 as a power source. On the contrary, when the bridging chip 104 enters a power saving state and the voltage converter 108 is disabled, the second voltage VOUT is not available. At this time, the cathode '−' of the Schottky diode SD is not coupled to the second voltage VOUT and the anode '+' of the Schottky diode SD is coupled to the bus voltage (5 volts.) Thus, the Schottky diode SD is switched on, and the bus voltage at the anode '+' is conveyed to the anode '−' to power the bridging chip 104. The bridging chip 104, therefore, is powered by the bus voltage and is capable of leaving the power saving state according to the resume command transferred from the host. The same operating concepts may be used in the design of the circuit of FIG. 2B as well.

Figure 2B:
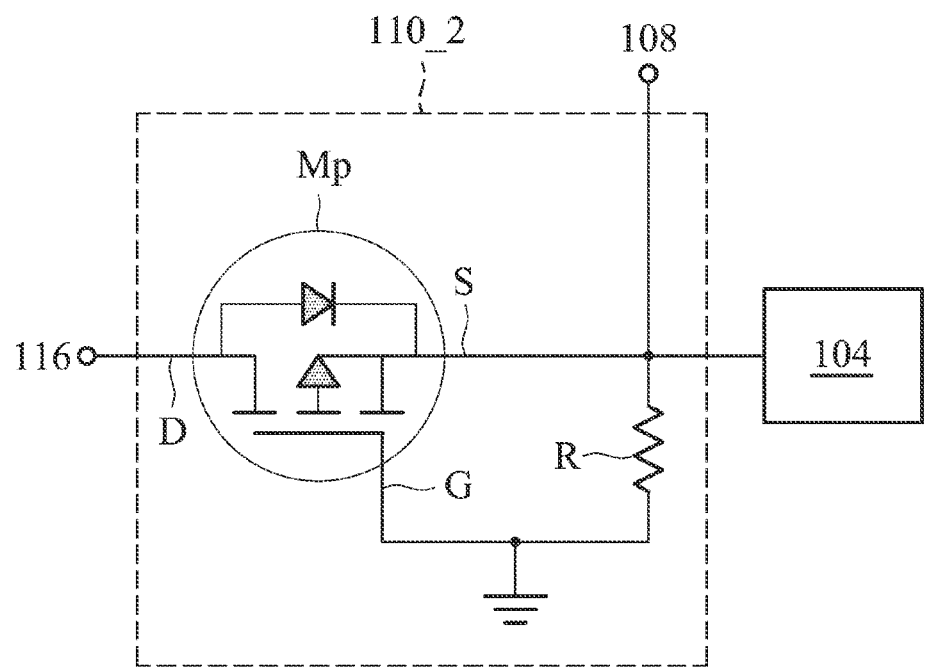
FIG. 2B depicts another exemplary embodiment of the selection circuit 110.

FIG. 2B depicts a selection circuit 110 in accordance with another exemplary embodiment of the disclosure.

Referring to FIG. 2B, a selection circuit 110_2 comprising a PMOS transistor Mp and a resistor R is shown. The PMOS transistor Mp has a drain D, a gate G and a source S. The drain D is coupled to the power pin 116 of the connector 102. The gate G is coupled to ground. The source S is coupled to the bridging chip 104 and the voltage converter 108. One terminal of the resistor R is coupled to the source S, the voltage converter 108 and the bridging chip 104. The other terminal of the resistor R is coupled to the ground. In the following discussion, the selection circuit 110_2 is discussed based on a USB interface. The bus voltage conveyed through the power pin 116 of the connector 102 is generally 5 volts. The second voltage VOUT is generally 5 volts, too. When the second voltage VOUT is available, the voltage difference (Vgs) between the gate G and source S of the PMOS transistor Mp is −5 volts, lower than the threshold voltage (i.e. Vth) of the PMOS transistor Mp. Thus, the PMOS transistor Mp is switched off, which blocks the bus voltage on the power pin 116 and conveys the second voltage VOUT to the bridging chip 104 as a power source. In an exemplary embodiment, the threshold voltage of the PMOS transistor Mp is generally between −2V to −3V. Note that when the bridging chip 104 enters a power saving state and the voltage converter 108 is disabled, the second voltage VOUT is unavailable. At this time, the voltage difference between the gate G and source S is 0 volt and is greater than the threshold voltage of the PMOS transistor Mp (e.g. −2V to −3V.) Thus, the PMOS transistor is turned on and the bus voltage on the drain D is conveyed to the bridging chip 104. The bridging chip 104 may be powered by the bus voltage, and is capable of leaving the power saving state according to a resume command transferred from the host 114.

The bridging device 100 may be implemented according to a USB interface, an IEEE 1394 interface or other communication protocols to communicate with the host 114. Any bridging device having an external power source (e.g. the aforementioned first voltage DCIN) coupled thereto and having a power pin in the connector (e.g. the VBUS pin of a USB connector) may use the power saving design of the disclosure. The power-saving method for a bridging device is discussed below.

Figure 3:
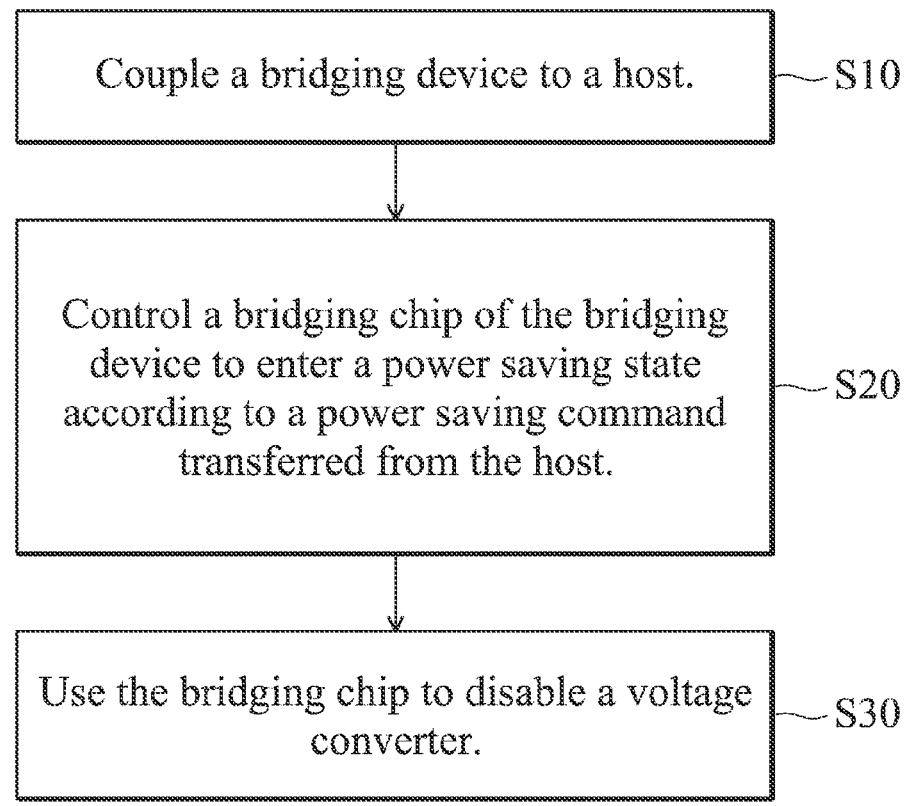
FIG. 3 depicts a power saving method for a bridging device in accordance with an exemplary embodiment of the disclosure.

FIG. 3 illustrates a power saving method for a bridging device in accordance with an exemplary embodiment of the disclosure, which comprises the steps discussed below.

In step S10, a bridging device is coupled to a host.

In step S20, a bridging chip of the bridging device executes a power saving operation according to a power saving command transferred from the host, to enter a power saving state.

In step S30, a voltage converter is disabled by the bridging chip. The voltage converter is for down converting a first voltage that is coupled to the bridging device to a second voltage. When the bridging chip is in a normal operating state, the bridging chip is powered by the second voltage. In this step, the redundant power consumption in the power saving state is reduced by disabling the voltage converter, where less power is consumed in comparison with the conventional design for the bridging chip. Further, when the bridging chip receives a resume command and a bus voltage transferred from the host, the bridging chip may be temporarily powered by the bus voltage and thereby may leave the power saving state according to the resume command. The bridging chip may further enable the voltage converter again when leaving the power saving state. The second voltage is available again to power the bridging chip. According to another exemplary embodiment of the disclosed method, the first voltage may be further blocked from powering an external peripheral device that is coupled to the bridging device, to save more power.

In conclusion, the disclosed bridging device and the power-saving method thereof may contain the advantages below.
1. By using the bridging chip to disable the voltage converter, the voltage converter stops operating in a power saving state and may consume no power. Thus, the power consumption that the bridging device consumes in the power-saving state is reduced for power saving.
2. In the power saving state, the selection circuit may choose to convey the bus voltage having lower power to the bridging chip as a power source. The power consumption of the bridging chip is reduced in the power-saving state, accordingly. The power consumption is effectively reduced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A bridging device configured to connect to a host, comprising:
  a connector for coupling to the host, wherein the connector has a power pin and a command pin;
  a voltage converter, down converting a first voltage to generate a second voltage;
  a bridging chip, disabling the voltage converter when receiving a power saving command from the host through the command pin to enter a power saving state; and
  a selection circuit coupled to the power pin, the voltage converter and the bridging chip,
  wherein:
  when receiving a bus voltage from the power pin as well as the second voltage from the voltage converter, the selection circuit selects to convey the second voltage to power the bridging chip;
  when receiving the bus voltage from the power pin but not receiving the second voltage from the voltage converter that is disabled by the bridging chip because of the power saving command, the selection circuit conveys the bus voltage from the power pin to power the bridging chip;
  the bridging chip is shut down when the selection circuit receives neither the bus voltage nor the second voltage;
  hardware executing the firmware of the bridging chip that has been shut down is awakened by receiving the bus voltage that is provided from the host at the power pin again;
  the hardware executing the firmware awakened by the bus voltage accesses storage units storing coefficients for configuring the bridging circuit to return to a normal operating state interrupted by the power saving command, wherein the coefficients comprise configuration settings for operating the bridging chip; and
  the hardware executing the firmware awakened by the bus voltage further executes a resume operation based on a resume command received from the host through the command pin and the retrieved coefficients, whereby upon execution of the resume operation, the bridging chip leaves the power saving state and returns back to the normal operating state.

2. The bridging device as claimed in claim 1, wherein the bridging chip in the power saving state with a portion of hardware powered by the bus voltage leaves the power saving state according to a resume command transferred from the host.

3. The bridging device as claimed in claim 2, wherein the bridging chip enables the voltage converter to generate the second voltage when the bridging chip leaves the power saving state, and the selection circuit selects to convey the second voltage to the bridging chip and thereby the bridging chip is powered by the second voltage to return to the normal operating state.

4. The bridging device as claimed in claim 1, wherein the selection circuit comprises:
  a Schottky diode having an anode and a cathode, wherein the anode is coupled to the power pin, and the cathode is coupled to the bridging chip and the voltage converter.

5. The bridging device as claimed in claim 1, wherein the selection circuit comprises:
  a P-type metal oxide semiconductor transistor having a drain, a gate and a source, wherein the drain is coupled to the power pin, the gate is coupled to a ground, and the source is coupled to the bridging chip and the voltage converter; and
  a resistor coupled between the source and the gate.

6. The bridging device as claimed in claim 1, wherein the bridging chip is further coupled to an external peripheral device for communications between the external peripheral device and the host.

7. The bridging device as claimed in claim 6, further comprising:
  a power switch coupled to the bridging chip, the second voltage, the first voltage and the external peripheral device, wherein the power switch is turned on by the bridging chip to convey the first voltage and the second voltage to the external peripheral device when the bridging chip leaves the power saving state.

8. The bridging device as claimed in claim 6, further comprising:
  a power switch coupled to the bridging chip, the second voltage, the first voltage and the external peripheral device, wherein the power switch is turned off by the bridging chip in the power saving state to stop conveying the first voltage and the second voltage to the external peripheral device.

9. The bridging device as claimed in claim 1, wherein the voltage converter is a buck dc-dc converter.

10. A power saving method for a bridging device configured to connect to a host, comprising:
  controlling a bridging chip of the bridging device to enter a power saving state according to a power saving command transferred from the host;

disabling a voltage converter of the bridging device by when the bridging chip receives the power saving command, wherein the voltage converter is configured to down convert a first voltage coupled to the bridging device to a second voltage; and using a selection circuit, wherein:

when receiving a bus voltage transferred from the host as well as the second voltage from the voltage converter, the selection circuit selects to convey the second voltage to power the bridging chip;

when receiving the bus voltage from the host but not receiving the second voltage from the voltage converter that is disabled by the bridging chip because of the power saving command, the selection circuit conveys the bus voltage from the host to power the bridging chip;

the bridging chip is shut down when the selection circuit receives neither the bus voltage nor the second voltage;

hardware executing the firmware of the bridging chip that has been shut down is awakened by receiving the bus voltage that is provided from the host again;

the hardware executing the firmware awakened by the bus voltage accesses storage units storing coefficients for configuring the bridging circuit to return to a normal operating state interrupted by the power saving command, wherein the coefficients comprise configuration settings for operating the bridging chip;

the hardware executing the firmware awakened by the bus voltage further executes a resume operation based on a resume command received from the host and the retrieved coefficients, whereby upon execution of the resume operation, the bridging chip leaves the power saving state and returns back to the normal operating state.

11. The power saving method as claimed in claim 10, further comprising:

controlling the bridging chip in the power saving state with a portion of hardware powered by the bus voltage to leave the power saving state and return to a the normal operating state according to a resume command from the host.

12. The power saving method as claimed in claim 11, further comprising:

enabling the voltage converter to generate the second voltage when the bridging chip leaves the power-saving state; and using the selection circuit to convey the second voltage to the bridging chip to power the bridging chip in the normal operating state.

13. The power saving method as claimed in claim 10, further comprising:

establishing communications between the host and an external peripheral device by the bridging device, wherein the external peripheral device is coupled to the bridging device.

14. The power saving method as claimed in claim 13, further comprising conveying the first voltage and the second voltage to the external peripheral device when the bridging chip leaves the power saving state.

15. The power saving method as claimed in claim 13, further comprising stopping conveying the first voltage and the second voltage to the external peripheral device when the bridging chip is in the power saving state.

16. The power saving method as claimed in claim 10, wherein the voltage converter is a buck dc-dc converter.

* * * * *